June 24, 1930.                H. R. HUMPHREY                1,766,075
                                 GAS STOVE
                            Filed Jan. 19, 1926        3 Sheets-Sheet 1

INVENTOR
Hubert R. Humphrey
BY
ATTORNEYS

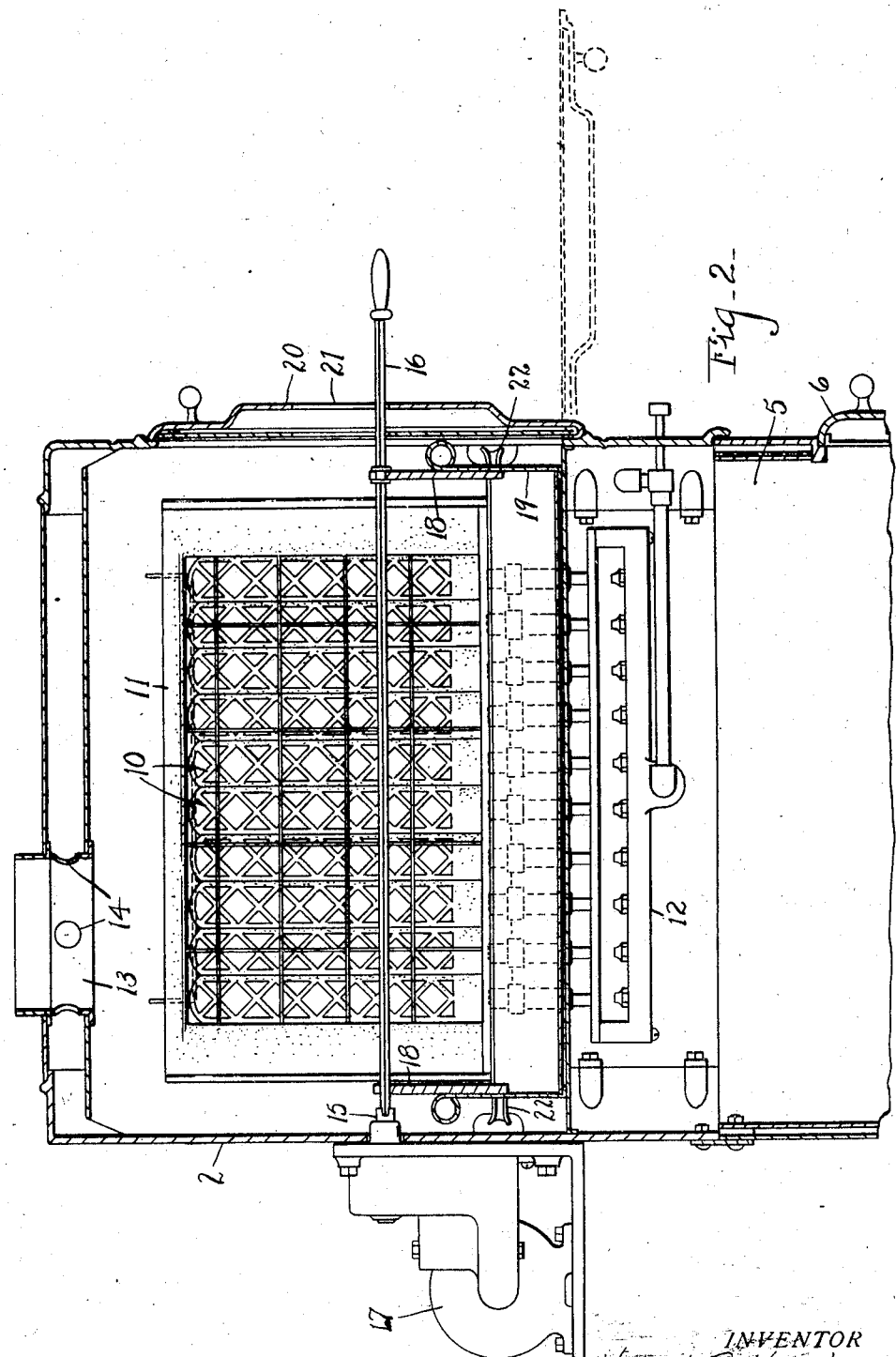

June 24, 1930. H. R. HUMPHREY 1,766,075
GAS STOVE
Filed Jan. 19, 1926 3 Sheets-Sheet 3

INVENTOR
Hubert R. Humphrey
BY
ATTORNEY

Patented June 24, 1930

1,766,075

UNITED STATES PATENT OFFICE

HUBERT R. HUMPHREY, OF KALAMAZOO, MICHIGAN, ASSIGNOR TO GENERAL GAS LIGHT COMPANY, OF KALAMAZOO, MICHIGAN

GAS STOVE

Application filed January 19, 1926. Serial No. 82,248.

The main objects of this invention are:

First, to provide an improved gas or vapor burning cooking stove which is well adapted for various kinds of cooking such as cooking upon an open burner, baking, roasting, toasting or broiling.

Second, to provide an improved cooking stove embodying these advantages which is compact in structure and highly efficient.

Objects pertaining to details and economies of construction and operation of my invention will definitely appear from the detailed description to follow. The invention is clearly defined and pointed out in the claims.

A structure embodying the features of my improvements is clearly illustrated in the accompanying drawing forming a part of this application, in which:

Fig. 2 is a detail vertical section on a line corresponding to line 2—2 of Fig. 1.

Figure 1:
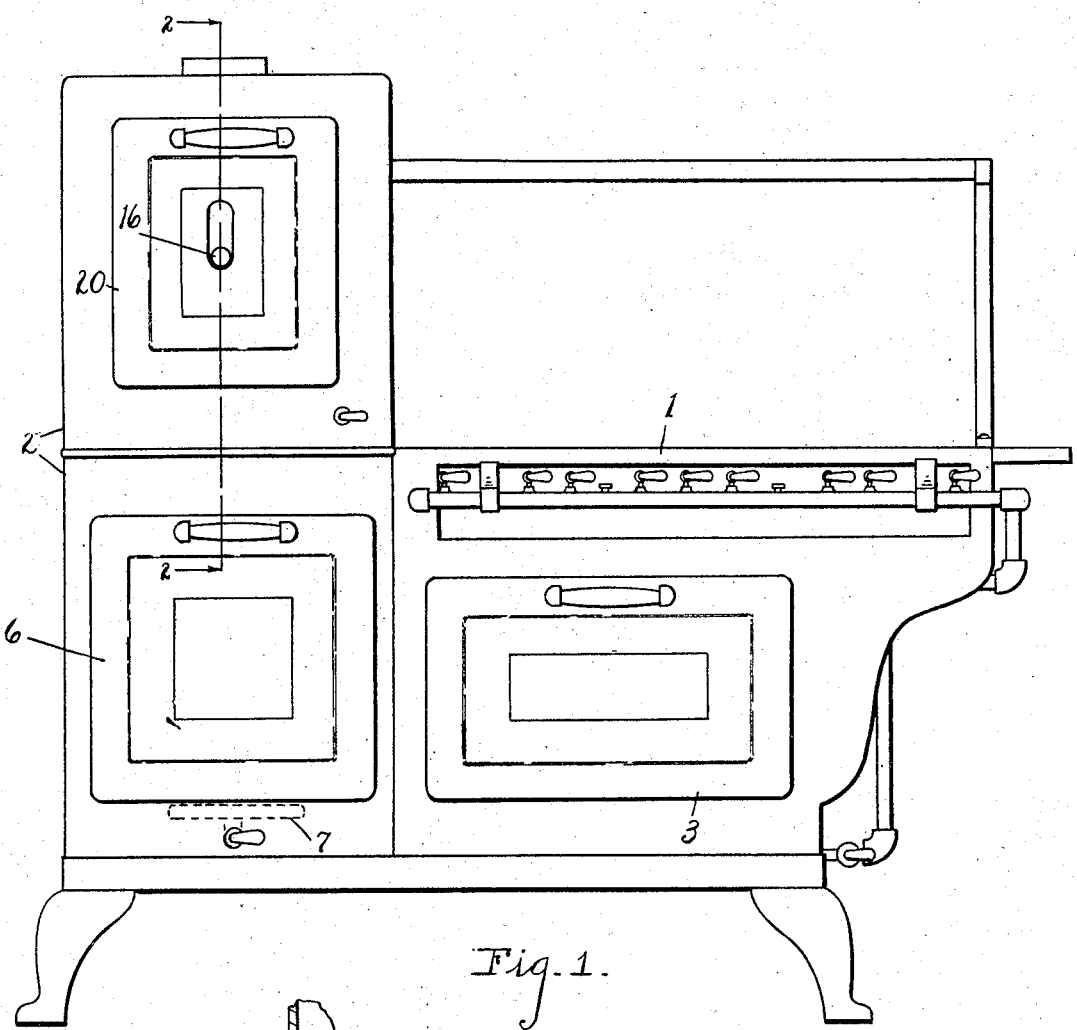
Fig. 1 is a front view of my improved cooking stove.

In the embodiment of my invention illustrated, I provide an open burner unit designated generally by the numeral 1. At the side of this is an oven unit comprising a casing designated generally by the numeral 2, there being a warming oven designated generally by the numeral 3 at the side of the oven unit and below the open burner unit.

The oven unit has a lower compartment 5 provided with a door 6. A burner 7 is arranged at the bottom of this oven compartment 5 which is adapted for baking and the like. Above this lower compartment is a compartment 8 having an opening 9 at one side. A heating unit comprising radiating elements 10, a fireback 11, and a burner 12 coacting with the radiating elements is mounted within the casing 2 so that the radiating elements face the opening 9.

The compartment 8 is provided with a vent flue 13 which has side openings 14 therein communicating with the space within the casing, surrounding the compartment 8. At the rear of the compartment 8 is a driving element 15 for an implement such as the spit 16. This driving element is driven from a motor shown conventionally at 17. The spit is rotatably mounted in supports 18 on the ends of the pan 19, the supports being adapted to coact with the driving element and rotatably supporting the implement when engaged with the driving element or to rotatably support it when the implement is withdrawn from the driving element.

The compartment 8 is provided with a door 20 having a slot-like opening 21 therein through which the implement 16 projects. The door is adapted to be swung to a horizontal position as shown in Fig. 2, in which position it constitutes a support for the pan when the pan is withdrawn from the compartment, the compartment being provided with opposed slide ways 22 for this pan.

Figure 5:
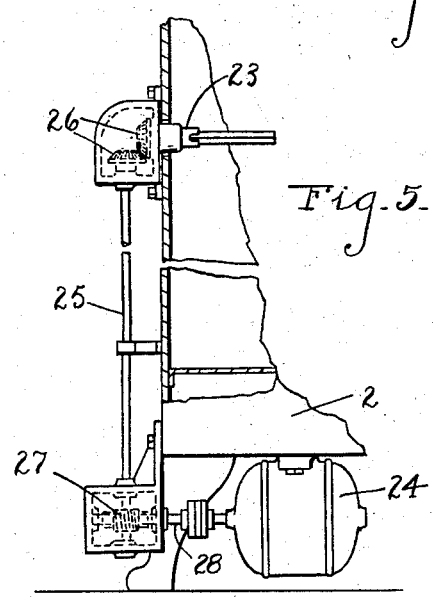
Fig. 5 is a detail vertical section showing a modified form of driving means.
Figure 3:
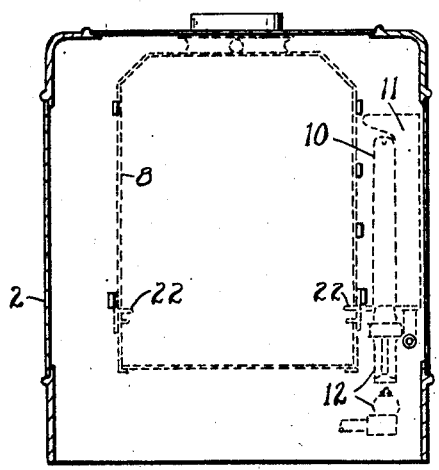
Fig. 3 is a detail vertical section through the outer casing, the inner or cooking compartment being indicated by dotted lines.
Figure 4:
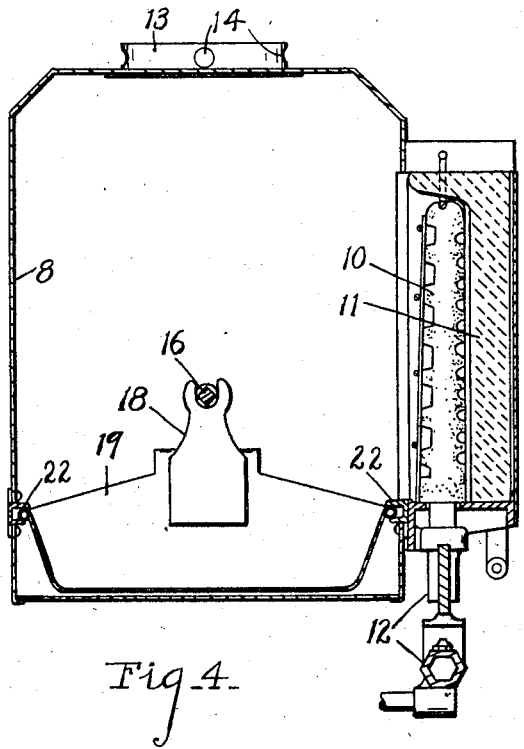
Fig. 4 is an enlarged detail section through the inner compartment and the burner unit.

In the modification shown in Fig. 5 the driving element 23 is driven from a motor 24 arranged beneath the oven casing 2, a vertical shaft 25 being arranged at the rear of the casing and connected by the beveled gears 26 to the driving element 23, and by suitable gearing shown conventionally at 27 to the shaft 28 of the motor.

My improved cooking stove is very efficient and is well adapted for domestic uses as it is compact and means are provided for the several kinds of cooking.

Having thus described my invention, what I claim as new and desire to secure by Letters Patent is:

1. A gas stove comprising a casing having a lower oven compartment provided with a burner and with a door and an upper compartment having a side opening, said upper compartment having a door with a vertical slot therein, said upper compartment door being hinged at the bottom thereof to swing to a horizontal position with its inner side in approximately the plane of the bottom of the upper compartment, a heating unit disposed within said casing and facing said side opening in said upper compartment, an implement driving element at the rear of said upper compartment, a pan slidable within said upper compartment, said upper compartment door being adapted to constitute a support therefor when the pan is retracted, said pan being provided with implement supports at its ends rotatably supporting an implement while engaged with or disengaged from said driving element, and an implement engageable with said supports, said opening in said door being disposed to receive the projecting end of said implement when the door is closed.

2. A gas stove comprising a casing having a lower oven compartment provided with a burner and with a door and an upper compartment having a side opening, said upper compartment having a door hinged at the bottom thereof to swing to a horizontal position with its inner side in approximately the plane of the bottom of the upper compartment, a heating unit disposed within said casing and facing said side opening in said upper compartment, an implement driving element at the rear of said upper compartment, a pan slidable within said upper compartment, said upper compartment door being adapted to constitute a support therefor when the pan is retracted, said pan being provided with implements supports at its ends adapted to rotatably support an implement while engaged with or disengaged from said driving element, and an implement engageable with said supports.

3. A gas stove comprising a casing having a lower oven compartment provided with a burner and with a door and an upper compartment having a side opening, said upper compartment having a door with a vertical slot therein, said upper compartment door being hinged at the bottom thereof to swing to a horizontal position with its inner side in approximately the plane of the bottom of the upper compartment, a heating unit disposed within said casing and facing said side opening in said upper compartment, an implement driving element at the rear of said upper compartment, a pan slidable within said upper compartment, said upper compartment door being adapted to constitute a support therefor when the pan is retracted, said pan being provided with implement supports at its ends adapted to support an implement, and an implement engageable with said supports, said opening in said door being disposed to receive the projecting end of said implement when the door is closed.

4. A gas stove comprising a casing having a lower oven compartment provided with a burner and with a door and an upper compartment having a side opening, said upper compartment having a door hinged at the bottom thereof to swing to a horizontal position with its inner side in approximately the plane of the bottom of the upper compartment, a heating unit disposed within said casing and facing said side opening in said upper compartment, an implement driving element at the rear of said upper compartment, a pan slidable within said upper compartment, said upper compartment door being adapted to constitute a support therefor when the pan is retracted, said pan being provided with implement supports at its ends adapted to support an implement, and an implement engageable with said supports.

5. A gas stove comprising a casing having a compartment with a side opening, said compartment having a door with a vertical slot therein hinged at the bottom thereof to swing to a horizontal position with its inner side in approximately the plane of the bottom of the compartment, a heating unit disposed within said casing and facing said side opening in said upper compartment, an implement driving element at the rear of said compartment, a pan slidable within said compartment, said door being adapted to constitute a support therefor when the pan is retracted, said pan being provided with implement supports at its ends adapted to rotatably support an implement while engaged with or disengaged from said driving element, and an implement rotatably mounted in said supports, said opening in said door being disposed to receive the projecting end of said implement when the door is closed.

6. A gas stove comprising a casing having a compartment with a side opening, said compartment having a door hinged at the bottom thereof to swing to a horizontal position with its inner side in approximately the plane of the bottom of the compartment, a heating unit disposed within said casing and facing said side opening in said compartment, an implement driving element at the rear of said compartment, a pan slidable within said compartment, said door being adapted to constitute a support therefor when the pan is retracted, said pan being provided with implement supports at its ends adapted to rotatably support an implement while engaged with or discharged from said driving element, and an implement rotatably mounted in said supports.

7. A gas stove comprising a casing having a compartment with a side opening, said compartment having a door with a vertical slot therein hinged at the bottom thereof to swing to a horizontal position with its inner side in approximately the plane of the bottom of the compartment, a heating unit disposed within said casing and facing said side opening in said compartment, an implement driving element at the rear of said compartment, a pan slidable within said compartment, said door being adapted to constitute a support therefor when the pan is retracted, said pan being provided with implement supports at its ends adapted to rotatably support an implement while engaged with or disengaged from said driving element, and an implement rotatably mounted in said supports, said opening in said door being disposed to receive the projecting end of said implement when the door is closed.

8. A gas stove comprising a casing having a compartment with a side opening, said compartment having a door hinged at the bottom thereof to swing to a horizontal position with its inner side in approximately the plane of the bottom of the compartment, a heating unit disposed within said casing and facing said side opening in said compartment, an implement driving element at the rear of said compartment, a pan slidable within said compartment, said door being adapted to constitute a support therefor when the pan is retracted, said pan being provided with implement supports at its ends adapted to rotatably support an implement while engaged with or disengaged from said driving element, and an implement rotatably mounted in said supports.

9. A gas stove comprising a compartment with a side opening, said compartment having a door with an opening therein, a heating unit facing said side opening in said compartment, an implement driving element at the rear of said compartment, a pan slidable within said compartment, said pan being provided with implement supports at its ends adapted to rotatably support an implement while engaged with or disengaged from said driving element, and an implement adapted to rotatably engage said supports, said opening in said door being disposed to receive the projecting end of said implement when the door is closed.

10. A gas stove comprising a compartment with a side opening, said compartment having a door with an opening therein, a heating unit facing said side opening in said compartment, an implement driving element at the rear of said compartment, a pan slidable within said compartment, said pan being provided with implement supports at its ends adapted to rotatably support an implement while engaged with or disengaged from said driving element, and an implement adapted to rotatably engage said supports, said opening in said door being disposed to receive the projecting end of said implement when the door is closed.

11. A gas stove comprising a compartment with a side opening, said compartment having a door with an opening therein, a heating unit facing said side opening in said compartment, an implement driving element at the rear of said compartment, and an implement adapted to engage said driving element, said opening in said door being disposed to receive the projecting end of said implement when the door is closed.

12. A gas stove comprising a compartment with a side opening, said compartment having a door therein, a heating unit facing said side opening in said compartment, an implement driving element at the rear of said compartment, provided with a forwardly facing chuck, an implement detachably engageable with said chuck, and means with which said implement is detachably engageable for rotatably supporting the implement in chuck engaging position.

13. In a structure of the class described, the combination of a casing, a cooking chamber within said casing having a side opening, a heating unit mounted in said casing in opposed relation to said opening in said chamber, an implement driving element disposed at the rear of the cooking chamber, and a pan slidable within said cooking chamber and provided with implement supports adapted to facilitate the engagement of an implement with said driving element and to rotatably support the same when disengaged therefrom.

14. In a cooking stove, the combination of a chamber having a side opening, a heating element comprising radiating elements disposed in opposed relation to said side opening, a fireback at the rear of said radiating elements and a burner associated with said radiating elements, an implement driving element disposed at the rear of said chamber, and a pan slidable within said chamber and provided with supports adapted to rotatably support an implement and facilitate the engagement thereof with said driving element.

15. In a cooking stove, the combination of a chamber having a side opening, a heating element comprising radiating elements disposed in opposed relation to said side opening, an implement driving element disposed at the rear of said chamber, and a pan slidable within said chamber and provided with supports adapted to rotatably support an implement and facilitate the engagement thereof with said driving element.

16. In a structure of the class described, the combination of a main casing, a cooking chamber within said casing having a side opening, a heating unit casing mounted within said main casing and comprising a burner, radiating elements disposed to face said opening in said cooking chamber in operative relation to said burner, an implement driving element disposed at the rear of the cooking chamber, and a pan slidable within said cooking chamber and provided with implement supports adapted to guide an implement into coacting relation to said driving element.

In witness whereof I have hereunto set my hand.

HUBERT R. HUMPHREY.